(12) United States Patent
MacInnis et al.

(10) Patent No.: US 7,440,030 B2
(45) Date of Patent: Oct. 21, 2008

(54) METHOD AND APPARATUS FOR INTERLACED DISPLAY OF PROGRESSIVE VIDEO CONTENT

(75) Inventors: Alexander G. MacInnis, Los Altos, CA (US); Sheng Zhong, Fremont, CA (US); Jose R. Alvarez, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 445 days.

(21) Appl. No.: 10/247,044

(22) Filed: Sep. 19, 2002

(65) Prior Publication Data

US 2003/0058365 A1    Mar. 27, 2003

Related U.S. Application Data

(60) Provisional application No. 60/324,732, filed on Sep. 24, 2001.

(51) Int. Cl.
*H04N 7/01* (2006.01)
(52) U.S. Cl. .................. 348/446; 348/441; 348/458
(58) Field of Classification Search .......... 348/446, 348/441, 458, 448, 551
See application file for complete search history.

(56) References Cited

U.S. PATENT DOCUMENTS

| | | | |
|---|---|---|---|
| 5,497,199 A * | 3/1996 | Asada et al. ............. 348/446 |
| 5,517,247 A | 5/1996 | Correa et al. |
| 5,936,675 A * | 8/1999 | Zhang et al. ............ 348/446 |
| 5,963,261 A * | 10/1999 | Dean ...................... 348/446 |
| 6,069,664 A * | 5/2000 | Zhu et al. ................ 348/448 |
| 6,151,363 A * | 11/2000 | Burl et al. ............ 375/240.17 |
| 6,281,873 B1 * | 8/2001 | Oakley ................... 345/418 |
| 6,327,000 B1 * | 12/2001 | Auld et al. .............. 348/441 |
| 6,359,654 B1 * | 3/2002 | Glennon et al. ......... 348/448 |
| 6,690,426 B1 * | 2/2004 | Kim ....................... 348/446 |
| 6,727,958 B1 * | 4/2004 | Shyu ...................... 348/581 |

FOREIGN PATENT DOCUMENTS

WO    WO 97/14247    4/1997

OTHER PUBLICATIONS

Rockwell Semiconductors: "Bt868/Bt869 Flicker-Free Video Encoder with Ultrascale Technology (Datasheet)", Oct. 31, 1998, Rockwell Semiconductor Systems Inc.

* cited by examiner

*Primary Examiner*—Trang U. Tran
(74) *Attorney, Agent, or Firm*—McAndrews Held & Malloy, Ltd.

(57) ABSTRACT

A method is provided for displaying progressive video content on an interlaced display device. The method comprises vertically phase shifting video lines of the progressive video content to correctly position the video lines with respect to a video field of the interlaced display device. The method further comprises scaling the video lines of progressive video content to match a vertical size of a video field of the interlaced display device.

26 Claims, 5 Drawing Sheets

METHOD AND APPARATUS FOR INTERLACED DISPLAY OF PROGRESSIVE VIDEO CONTENT

RELATED APPLICATIONS

The applicants claim priority based on provisional application No. 60/324,732 filed Sep. 24, 2001, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Certain embodiments of the present invention relate to the display of video data. More particularly, certain embodiments relate to the vertical/temporal sampling and display of progressively scanned video data on an interlaced display device.

Vertical/temporal sampling and display of progressively scanned video data is discussed herein. It is contemplated that horizontal/spatial scaling of video data is handled independently of the vertical/temporal processing. scaling of video data is handled independently of the vertical/temporal processing.

"Artifacts" refer to visual blemishes in video that are not caused by the inherent sampling format and therefore are considered abnormal byproducts of video processing. "Top Field" refers to the field of video that starts at the first line in the displayed frame if each field of video is referenced to the physical start of the display. "Bottom Field", refers to the field of video that starts at the second line in a displayed frame if each field of video is referenced to the physical start of display of the first line of the frame. "Even/odd lines" refers to the even lines numbered 0, 2, 4, etc. (i.e. Top field in an interlaced frame) and the odd lines numbered 1, 3, 5, etc. (i.e. Bottom field in an interlaced frame) when the lines of a frame are numbered starting from '0' and a counter is incremented by one for each line. "Frames" refers to sets of video lines that constitute a coherent picture. "Frame-time" refers to the period of time used to sample or display all the lines in the frame. One frame-time of $1/30^{th}$ of a second, for example, is the time interval between frames (i.e. between the starting times of successive frames). "Fields" refers to sets of video lines that are parts of frames of video wherein each field of a frame has about ½ the number of the total lines in the frame. "Field-time" refers to the time interval between two fields (i.e. between the starting times of successive fields).

Two types of video data, "progressive" and "interlaced" video data, are typically generated as frames of video. An interlaced video comprises two fields that are sampled at two different times; and each field comprises either the even or odd lines of the video data. For interlaced video, half the lines in the frame are displayed in one field-time and the other half of the lines are displayed in the next field-time. Each frame of video is displayed on a presentation device at a specific frame rate. For purposes of discussion herein, a 30 Frame/sec ("fps") rate is used to indicate the display rate for frames while a 60 Field/sec rate is used to indicate the display rate for individual fields in an interlaced frame, where the interlaced frame (i.e., two fields) is displayed at 30 Frame/sec.

A progressive frame is usually sampled line by line after sampling starts at one time. A CIF (Common Image Format) frame (240 lines) is such an example. It may be displayed on a 525-line (about 480 active lines) or a 625-line (about 576 active lines) interlaced system, which is alternatively referred to as an "NTSC-display" or "PAL-display" respectively. While a representative frame rate of 30 fps may be utilized as provided above, other frame rates, including 25 fps, 29.97fps, 23.976 fps, etc., are contemplated.

In the interlaced video case, with top and bottom (or even and odd) fields, there is a vertical positional offset between the two fields. In the progressive video case, there are no fields.

In very general terms, the task of displaying progressive video content on interlaced presentation devices may involve changing the sampling rate and sampling grid. Not only are the lines in the original progressive frame displayed at field rates, but they are also displayed with a vertical offset between fields that are characteristic of interlaced displays.

Generally the progressive video data is meant to be displayed on a progressive presentation device. The video data is typically, but not always, displayed one line at a time starting from the top of the frame all the way to the bottom of the frame during one display time. If the lines in the progressive frame are numbered 0, 1, 2, 3, . . . and the data is sampled at a frame rate of 30 frm/sec, then all lines (0, 1, 2, 3, . . . ) may be displayed in succession in $1/30$ second. However, this is not the case for typical CRT (cathode ray tube) designs, for example.

Generally the interlaced video is meant to be displayed on an interlaced presentation device as separate fields of video. If the lines in the interlaced video frame are numbered 0, 1, 2, 3, . . . then by convention the even-numbered lines belong to the top field and the odd-numbered lines belong to the bottom field. An interlaced frame of video implies that the fields are sampled at different times and are displayed on the presentation device at different times. For example, if an interlaced video frame is displayed in $1/30$ second, the top field (lines 0, 2, 4, . . . ) is displayed in a $1/60$ second time period and the bottom field (lines 1, 3, 5, . . . ) is typically displayed in the next $1/60$ second period.

Displaying progressive video on a progressive presentation device generally results in no display artifacts. Similarly, there are no unexpected visual problems when interlaced video is displayed on interlaced presentation devices. Artifacts (both spatial and temporal) may be created when displaying progressive video on interlaced devices, or when displaying interlaced video on progressive devices.

Video lines in a progressive frame containing "n" lines may be denoted as p0, p1, p2, p3, . . . p(n−1) and video lines in an interlaced frame containing "m" lines are denoted as i0, i1, i2, i3, . . . i(m−1), where the top field comprises the even numbered lines i0, i2, i4, . . . i(m−2) and the bottom field comprises the odd numbered lines i1, i3, i5, . . . i (m−1).

Progressive content may be displayed on interlaced devices using progressive lines p0, p1, p2, p3, . . . p(n−1) in one field-time interval ($1/60$ sec), and the same lines p0, p1, p2, p3, . . . p(n−1) in a second field-time interval ($1/60$ sec) where "n" is the number of progressive video lines. If "n" is not equal to "m/2" (where m is the number of interlaced video lines), spatial (i.e., vertical) scaling is performed to match the progressive video lines to the interlaced display format. Since the lines of the interlaced fields have a different vertical position from one field-time interval to the next, the display of the progressive video lines p0, p1, p2, . . . for both fields causes a vertical shift that manifests itself as a display artifact that looks like vertical hopping. Vertical scaling may produce additional artifacts depending on the scaling ratios used.

Progressive content may be displayed on interlaced devices by displaying video lines p0, p1', p2, p3', p4, ... in an even field interval (1/60 sec), and p0', p1, p2', p3, ... in a next odd field interval (1/60 sec), where p1', p3', ... are spatially interpolated lines from p0, p2, p4, ..., and p0', p2', ... are spatially interpolated lines from p1, p3, p5, ... If "n" (number of progressive video lines in a progressive frame) is not equal to "m/2" (where m is the number of interlaced video lines in an interlaced frame), then vertical scaling is performed for each independent field using the lines from the even and odd fields as defined above. The original lines of the progressive frame are displayed in the correct relative vertical positions with respect to each other. The interpolated lines are positioned in between the original lines, using a different set of interpolated lines for each field as described above. However, the interpolation process causes a display artifact of vertical blur that reduces the quality of the original video.

Further limitations and disadvantages of conventional and traditional approaches will become apparent to one of skill in the art, through comparison of such systems with certain embodiments of the present invention as set forth in the remainder of the present application with reference to the drawings.

BRIEF SUMMARY OF THE INVENTION

An embodiment of the present invention provides an approach to display progressive video content on an interlaced display device. In an embodiment of the present invention a display device produces a high quality video display and is less complex than more advanced, previously known display devices.

A method is provided for displaying progressive video content on an interlaced display device. The method comprises vertically phase shifting video lines of the progressive video content to correctly position the video lines with respect to a video field of the interlaced display device. The method further comprises scaling the video lines of progressive video content to match a vertical size of a video field of the interlaced display device.

Apparatus is provided for displaying progressive video content on an interlaced display device. The apparatus comprises a line selection module (LSM) to select a set of video lines from the progressive video content. The apparatus further comprises a vertical phase shifter and scaling (VPSS) module responsive to the set of video lines to generate output video lines in a correct position on the interlaced display device. The vertical phase shifter function of the VPSS module positions the video lines for correct display in accordance with the line positions of each of the top and bottom fields of the interlaced display and the scaling function of the VPSS module adjusts the number of lines to match the vertical size of the progressive source frames to the vertical size of the interlaced display fields.

Certain embodiments of the present invention afford an approach to display progressive video content on an interlaced display device in an efficient and effective manner that preserves image quality and prevents image artifacts.

Other aspects, advantages and novel features of certain embodiments of the present invention, as well as details of an illustrated embodiment thereof, will be more fully understood from the following description and drawing, wherein like numerals refer to like parts.

DETAILED DESCRIPTION OF THE INVENTION

An embodiment of the present invention provides the ability to perform vertical phase shifting of video data separately for top and bottom fields in order to position video data correctly on the top and bottom display fields. Further, an embodiment of the present invention enables video to be optionally scaled in combination with the vertical phase shifting, thereby fitting progressive video frames onto an interlaced display device at whatever size is desired. Also, an embodiment of the present invention combines vertical phase shifting and scaling in one polyphase filter structure.

Figure 1A:
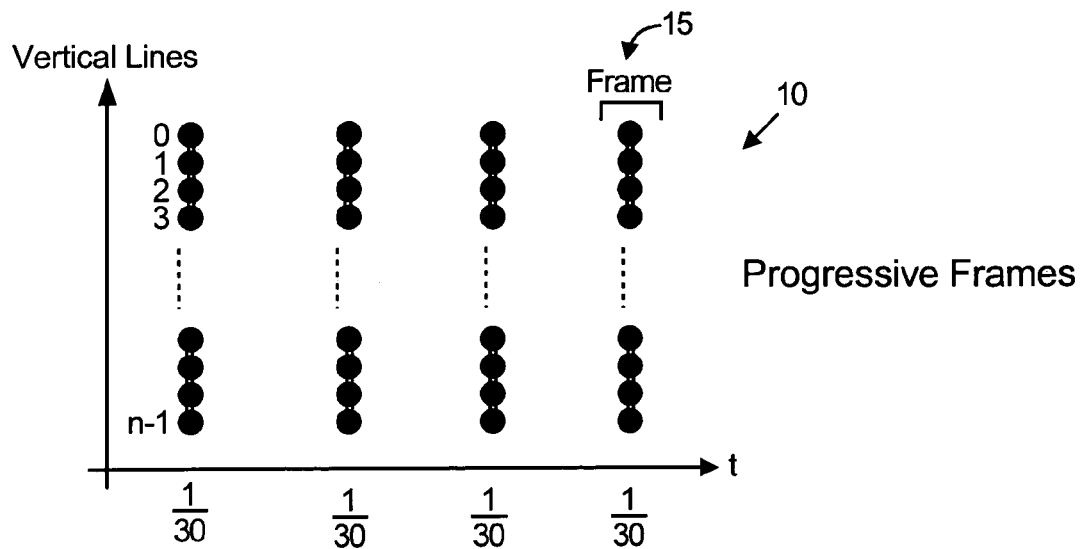
FIGS. 1A and 1B illustrate video frames in both progressive and interlaced formats viewed from the horizontal axis along each video line.
Figure 1B:
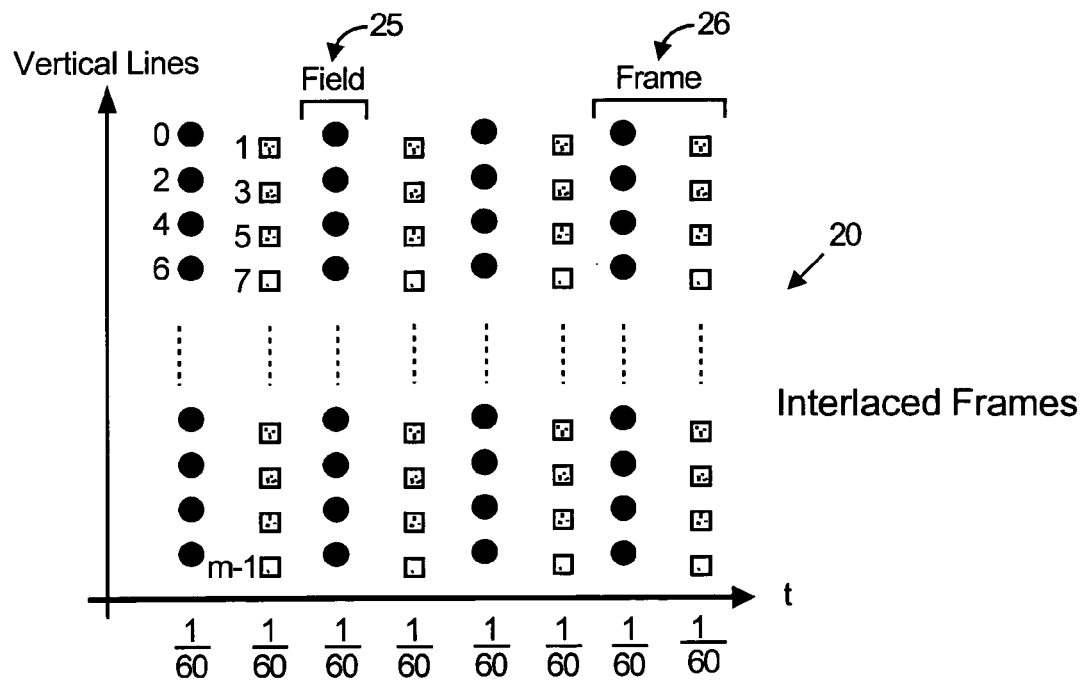

FIGS. 1A and 1B illustrate video frames in both progressive 10 and interlaced 20 video formats viewed from the horizontal axis along each line ('looking into' the lines from the side). FIGS. 1A and 1B also illustrate the relative vertical position of adjacent lines across time. The lines of the source progressive frame 10 have a consistent vertical position with respect to the top of the frame across time.

In FIG. 1A, all of the progressive video lines for a given frame (e.g. 15) are not decomposed into fields and are displayed in a single frame time. In FIG. 1B, the video lines exist in two separate fields. Field 25 is an example of one field of a pair of fields in a frame. A frame 26 clearly shows two fields that are displayed during two different field times. The vertical positions of the fields are different from each other.

Figure 2:
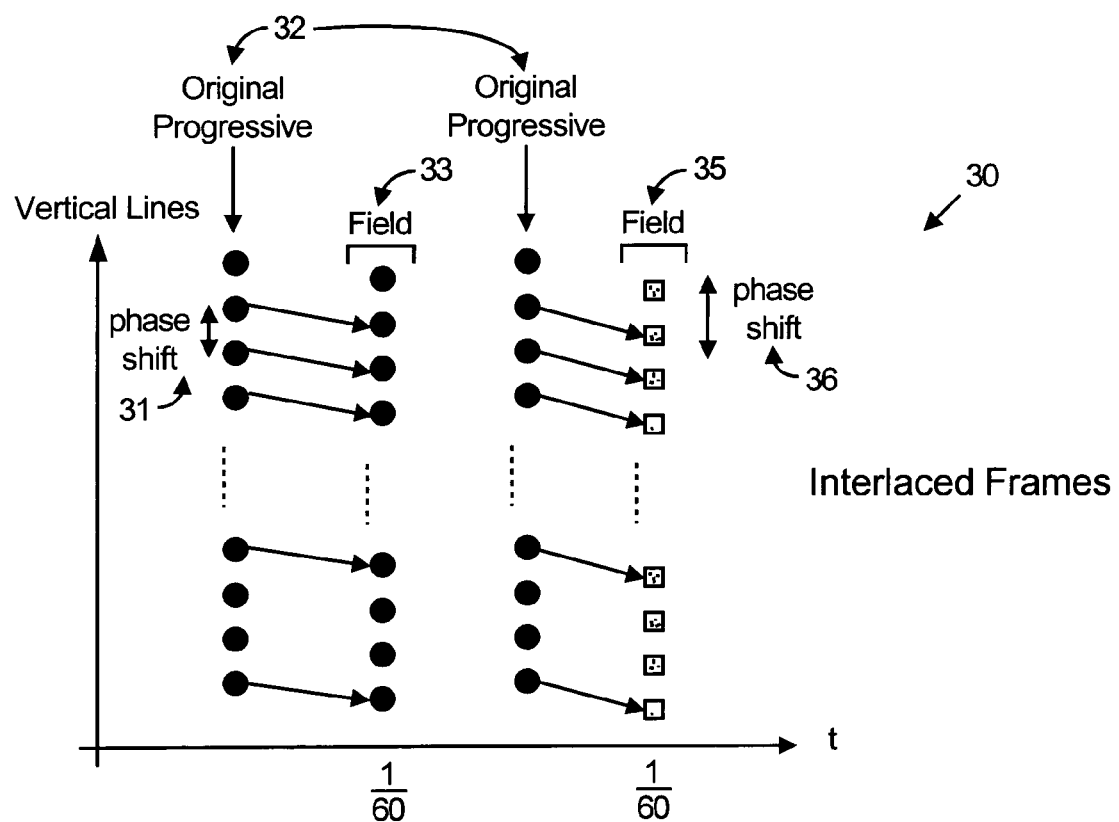
FIG. 2 illustrates vertical phase shifting of the progressive video content of FIG. 1 for display on an interlaced display device in accordance with an embodiment of the present invention.

One example of a commonly needed conversion is the interlaced display of Standard Image Format ("SIF") video, which is progressive video. The task here is to display 240 lines from one frame produced at 30 frames/sec as an interlaced frame with 480 lines per frame displayed also at 30 frames/sec. Referring to FIG. 2, the entire 240 progressive video lines 32 are displayed on the top interlaced field 33 with an initial vertical phase shift 31 implementing a shift of ½ of a frame line with respect to the top of the frame. For the bottom field 35, the same 240 progressive lines 32 are displayed with a different starting vertical phase 36 implementing a shift of one frame line with respect to the first field of the frame. While FIG. 2 illustrates phase shifting in the downward direction for both fields, it should be appreciated that one or both phases may be shifted in the upward direction as long as the relative positions of the two fields are correctly kept.

Figure 3:
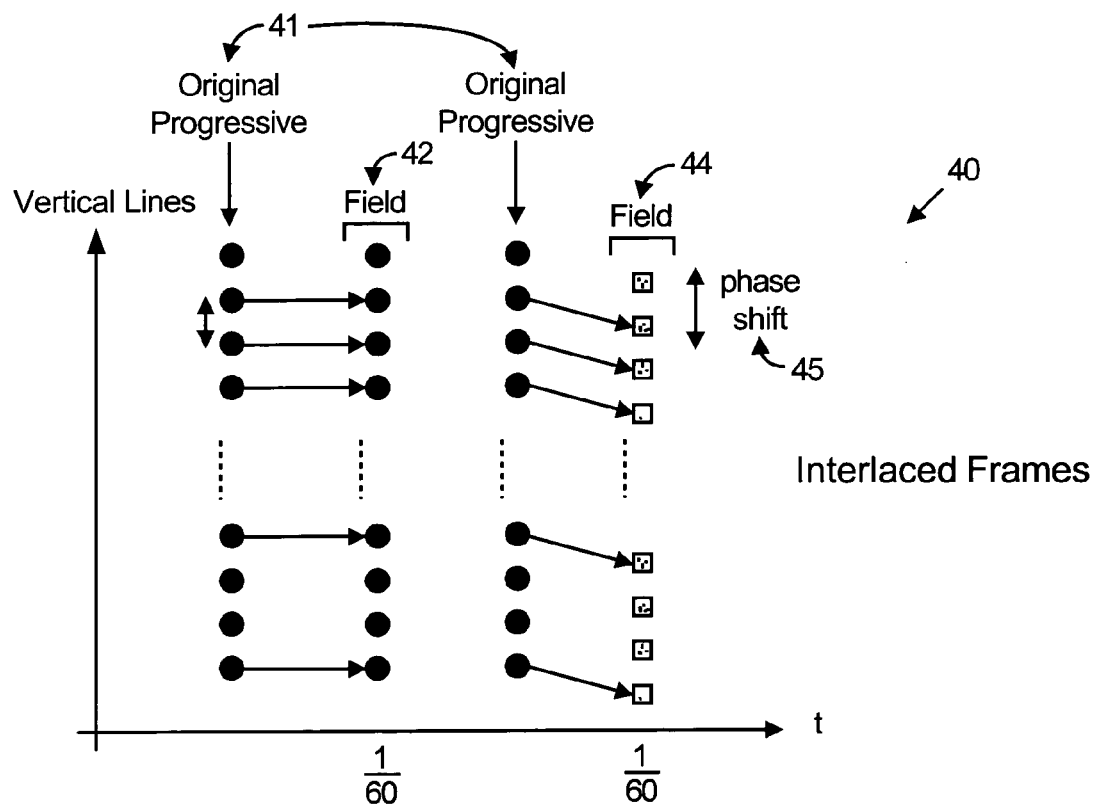
FIG. 3 illustrates another embodiment of vertical phase shifting of progressive video content for display on an interlaced display device in accordance with an embodiment of the present invention.

FIG. 3 illustrates another embodiment of the present invention used for an alternative display arrangement. In the embodiment, the original progressive video content 41 is not shifted vertically when it is displayed as the top field 42. Only the second field 44 is shifted by ½ frame line 45 with respect to the first field 42.

Figure 4:
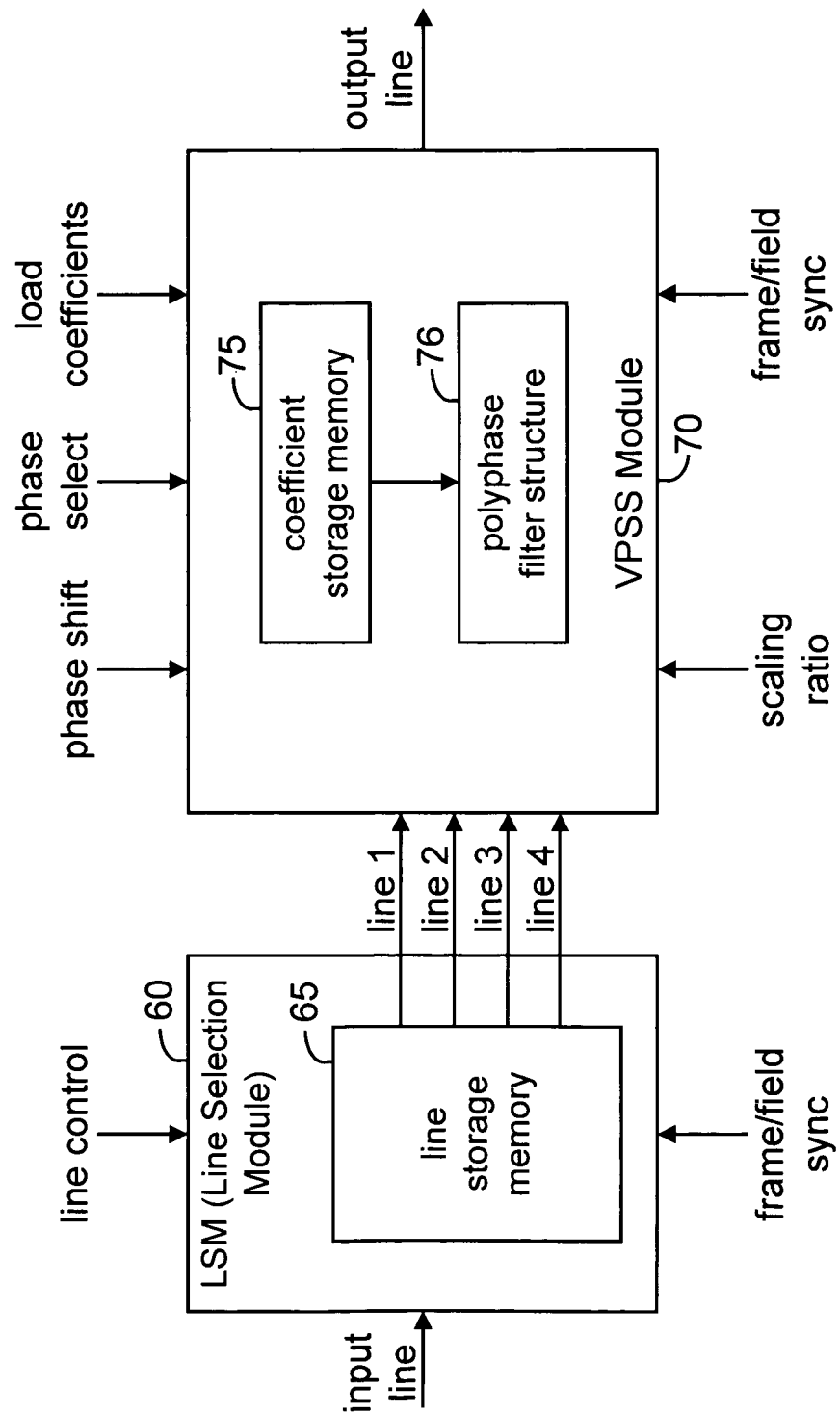
FIG. 4 illustrates a block diagram of the line selection module (LSM) and vertical phase shifter and scaler (VPSS) module in accordance with an embodiment of the present invention.

An apparatus embodiment of the present invention is illustrated in FIG. 4 as conversion apparatus 50. Input video lines of progressive video content (e.g. line 1 to line 4) are selected and presented by a line selection module (LSM) 60 to a vertical phase shifter and scaler (VPSS) module 70. VPSS module 70 produces one output line at a time using an internal polyphase filter structure 76. VPSS module 70 is externally programmed with an initial phase shift selection for each field type and with the values of the coefficients for each phase. In an embodiment of the present invention, vertical frame and field synchronization information may be used by both modules (LSM and VPSS module) to coordinate processing between the two modules.

The LSM 60 may present a combination of lines to the VPSS module 70 depending on the scaling ratio or display rate desired at the output of the system. In an embodiment of the present invention, the LSM 60 includes a line storage memory 65 for storing the selected progressive video lines. For example, if the system is required to generate more lines for display than the input number of lines (i.e., scale up), then the lines stored in the LSM 60 are used multiple times in order to produce a higher number of lines at the output of the VPSS module 70, which is a normal consequence of scaling.

The conversion apparatus 50 produces a high quality video display and is less complex than known systems in the prior art. The vertical phase shifter function of the VPSS 70 positions the video lines for correct display in accordance with the line positions of each of the top and bottom fields. The scaler function of the VPSS 70 adjusts the number of lines to match the vertical size of the progressive source frames to the vertical size of the interlaced display fields. It should be appreciated that scaling is optional. In an embodiment of the present invention, the phase shifter and scaler functions are combined in a single polyphase filter structure 76 within the VPSS 70.

In general, polyphase filters may be used to perform sample rate conversion in spatial up/down scaling applications. The polyphase filter structure 76 may be expressed by a single finite impulse response (FIR) filter with loadable coefficients. However, a polyphase filter structure may not be needed unless scaling is being performed. Phase shifting without scaling does not require a polyphase filter. A simple phase shift filter having one phase may suffice. The polyphase filter structure comprises a predetermined number of phases. Each phase of the polyphase filter structure is associated with a specific phase shift of the filter. Phase shifting the progressive input image by the correct amount to match the field positions on the interlaced display produces a high quality display. A well designed phase shift filter, such as one that uses 4 or 6 taps, gives much better results than, for example, a 2 tap filter. The number of taps is independent of the number of phases.

Figure 5:
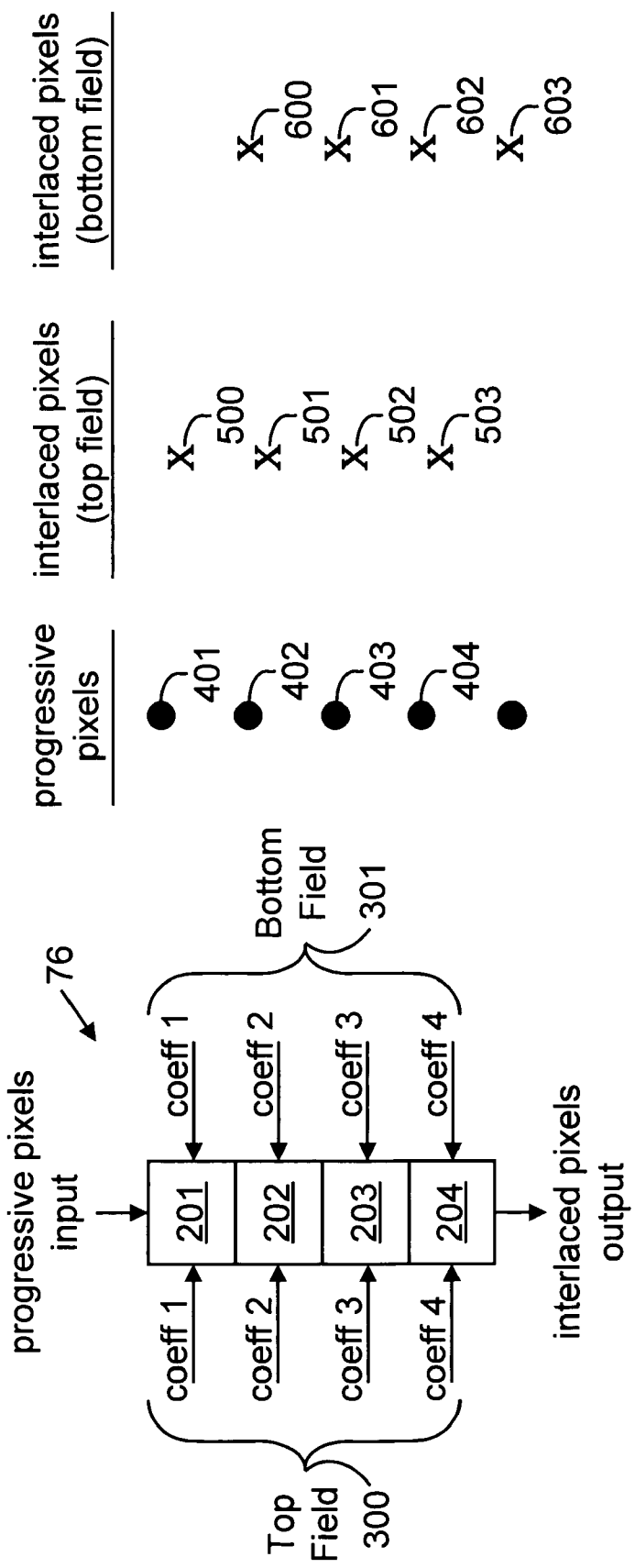
FIG. 5 illustrates a polyphase filter structure, that is a part of the VPSS module of FIG. 4, and an exemplary progressive to interlaced video pixel conversion in accordance with an embodiment of the present invention.

For example, FIG. 5 illustrates an embodiment of the present invention that includes a vertical polyphase filter structure 76. The 4 coefficients (e.g. 300) associated with one phase correspond to 4 taps of a normal FIR processing structure (i.e. the FIR processing structure is at the heart of the polyphase filter structure). The FIR processing structure is used to implement the processing at each phase in the polyphase filter structure 76. The initial phase of the polyphase filter for each field type is chosen to provide the correct vertical positioning as required for the particular progressive to interlace conversion, combined with the chosen scaling factor.

In an exemplary embodiment with a 4 tap filter as illustrated in FIG. 5, to generate a given interlaced pixel value in an interlaced video line, the FIR filter associated with one selected phase of the filter is loaded with four progressive video pixel values (e.g. 401-404), i.e. two values above (e.g. 401 and 402) the output pixel position of interest (e.g. 501 or 601) and two below (e.g. 403 and 404). Each progressive video pixel value in the filter is multiplied by its corresponding filter coefficient. The products are then summed to generate the new interlaced pixel value (e.g. 501).

FIG. 5 illustrates four pixels (500-503) that are generated for the top field and four pixels (600-603) that are generated for the bottom field. In the example of FIG. 5, it may be seen how the top field pixels (500-503) are shifted vertically with respect to the progressive pixels (401-404) and how the bottom field pixels (600-603) are also shifted vertically to a different position which is interlaced between the top field pixels (500-503). The final result is a set of interlaced video lines having twice the density of the original progressive video lines.

In an exemplary embodiment, the coefficients corresponding to each phase of the polyphase filter structure 76 may be programmed at any time. Further, the coefficients are double buffered so that, once the system is operating in the active portion of the current field, any changes in the coefficients do not take effect until the next field. Furthermore, the initial phase offset may be programmed before the beginning of the next field, but it is fixed for the duration of the active portion of such a field. As a result, the polyphase filter structure 76 may be programmed completely differently for both scaling and initial phase shifting for individual fields. In an embodiment of the present invention, the VPSS module 70 includes a coefficient storage memory 75 to store enough coefficients to define two fields of data, obviating the need to program the coefficients every field to obtain a frame of video.

For any given configuration, two initial phases are contemplated for the polyphase filter structure 76; one initial phase for the top display fields; and one initial phase for the bottom display fields. Choosing the vertical starting phases correctly for each field results in a vertical displacement that places the original progressive video material in the correct vertical locations with the correct vertical offset for proper interlaced display, taking into account any scaling to be performed. In an embodiment of the present invention, the initial phase may be flexibly selected without directly changing the filter structure or value of the individual coefficients. The initial phases are chosen separately and correctly for each of the top and bottom fields. The polyphase filter may be designed as a pure phase shift filter in those instances where scaling is not required.

In an alternative embodiment of the present invention, the progressive video frames are scaled to produce a complete interlaced frame, containing both top and bottom fields. The fields are selected for display from the resulting interlaced frame.

The various elements of the conversion apparatus 50 may be combined or separated according to various embodiments of the present invention. For example, the vertical shifting function and scaling function may be implemented as separate filter structures instead of as a single structure.

In summary, certain embodiments of the present invention enable the display of progressive video material on interlaced displays by positioning and phase shifting the progressive input lines on to the interlaced display-sampling grid. Combining vertical phase shifting and scaling enables interlaced display and scaling to a desired display size. Implementing vertical phase shifting and scaling together reduces complexity when compared with separate scaling and phase shifting functions. Certain embodiments of the present invention do not require temporal processing to be performed to obtain good quality conversions. Selecting the proper generation of coefficients, phases and starting offset independently for each field of video generated means that embodiments of the present invention are hardly more complex to implement than a conventional polyphase filter structure. Furthermore, certain embodiments of the present invention include programmable loading of the coefficients for the phases, phase offset and selection so that certain embodiments of the present invention are capable of handling a variety of conversion formats.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for displaying progressive video content on an interlaced display device where an interlaced display frame has at least twice as many video lines as a progressive input frame, said method comprising:
    vertically phase shifting each of a plurality of video lines of said progressive video content by equal phase shifts to correctly position each of said plurality of video lines with respect to at least one video field of said interlaced display device; and
    double buffering a set of coefficients such that, once vertically phase shifting in an active portion of a video field, any change in said set of coefficients does not take effect until a next video field time.

2. The method of claim 1 further comprising scaling said at least one video line of said progressive video content to match a vertical size of said at least one video field of said interlaced display device.

3. The method of claim 1 wherein said at least one video field comprises a top video field of said interlaced display device.

4. The method of claim 1 wherein said at least one video field comprises a bottom video field of said interlaced display device.

5. The method of claim 1 wherein said vertically phase shifting comprises performing filtering with a filter having one phase.

6. The method of claim 1 wherein said vertically phase shifting comprises performing polyphase filtering using at least 4 taps.

7. The method of claim 2 wherein said scaling comprises performing polyphase filtering.

8. The method of claim 5 wherein said performing filtering comprises performing finite impulse response (FIR) filtering.

9. The method of claim 6 wherein said performing polyphase filtering comprises performing finite impulse response (FIR) filtering.

10. The method of claim 7 wherein said performing polyphase filtering comprises performing finite impulse response (FIR) filtering.

11. The method of claim 5 further comprising choosing an initial phase for said filtering to correctly position said at least one video line with respect to said at least one video field of said interlaced display device.

12. The method of claim 6 further comprising choosing an initial phase for said polyphase filtering to correctly position said at least one video line with respect to said at least one video field of said interlaced display device.

13. The method of claim 6 further comprising selecting polyphase filter coefficients in response to, in part, a scaling ratio wherein said scaling ratio defines the number of interlaced video field lines with respect to a number of video lines in a frame of said progressive video content.

14. The method of claim 6 further comprising selecting polyphase filter coefficients in response to, in part, a scaling ratio wherein said scaling ratio is between an interlaced display frame and a progressive input frame.

15. The method of claim 2 wherein said scaling is responsive to a selected scaling ratio to scale said at least one video line of said progressive video content to match a vertical size of said interlaced display device.

16. Apparatus for displaying progressive video content on an interlaced display device, said apparatus comprising:
    a line selection module (LSM) to select a set of video lines from said progressive video content; and
    a vertical phase shifter and scaling (VPSS) module responsive to said set of video lines to generate at least one phase shifted output video line in a correct position on said interlaced display device by performing filtering, wherein said vertical phase shifter is programmed with a set of coefficients that are double buffered such that, once said apparatus is operating in an active portion of a video field, any change in said set of coefficients does not take effect until a next video field time.

17. The apparatus of claim 16 wherein said VPSS module is responsive to a selected scaling ratio to scale at least one video line of said progressive video content to match a vertical size of said interlaced display device.

18. The apparatus of claim 16 wherein said LSM includes a line storage memory to store said set of video lines.

19. The apparatus of claim 16 wherein said VPSS includes a polyphase filter structure to perform vertical phase shifting and scaling of said progressive video content.

20. The apparatus of claim 16 wherein said LSM and said VPSS module are responsive to vertical frame and field synchronization information to coordinate processing between said LSM and said VPSS module.

21. The apparatus of claim 19 wherein each phase of said polyphase filter structure is programmed with the set of coefficients corresponding to said each phase.

22. The apparatus of claim 19 wherein an initial phase offset of said polyphase filter structure is programmed before the beginning of a corresponding video field.

23. The apparatus of claim 19 wherein said polyphase filter structure is programmed differently for different video fields to affect said vertical phase shifting and said scaling.

24. The apparatus of claim 21 further comprising a storage memory to store said set of coefficients for said each phase of said polyphase filter structure for at least two video fields.

25. The apparatus of claim 19 wherein said polyphase filter structure comprises a finite impulse response (FIR) filter.

26. The apparatus of claim 21 wherein said each phase of said polyphase filter structure corresponds to at least one subset of video lines corresponding to at least one field of said interlaced display device.

* * * * *